US010213862B2

(12) United States Patent
Holverson et al.

(10) Patent No.: US 10,213,862 B2
(45) Date of Patent: Feb. 26, 2019

(54) WELDING SYSTEM FOR DETERMINING A QUALITY OF A WELDING OPERATION

(71) Applicant: ILLINOIS TOOL WORKS INC., Glenview, IL (US)

(72) Inventors: Todd Earl Holverson, Appleton, WI (US); Joseph K. Fink, New London, WI (US); Andrew Patrick Mulroy, Houston, TX (US); Jyi-Jiin Luo, Morton Grove, IL (US)

(73) Assignee: Illinois Tool Works Inc., Glenview, IL (US)

( * ) Notice: Subject to any disclaimer, the term of this patent is extended or adjusted under 35 U.S.C. 154(b) by 594 days.

(21) Appl. No.: 14/262,588

(22) Filed: Apr. 25, 2014

(65) Prior Publication Data

US 2014/0332514 A1    Nov. 13, 2014

Related U.S. Application Data

(60) Provisional application No. 61/822,035, filed on May 10, 2013.

(51) Int. Cl.
*B23K 9/095*    (2006.01)
*B23K 9/028*    (2006.01)
(Continued)

(52) U.S. Cl.
CPC .......... *B23K 9/0953* (2013.01); *B23K 9/0282* (2013.01); *B23K 9/0956* (2013.01);
(Continued)

(58) Field of Classification Search
CPC ...... B23K 9/00; B23K 9/0284; B23K 9/0282; B23K 9/0956; B23K 9/18; B23K 9/20;
(Continued)

(56) References Cited

U.S. PATENT DOCUMENTS 4,447,700 A * 5/1984 Cohen ................. B23K 11/252
219/110
5,721,415 A * 2/1998 Fortmann ............ B23K 11/258
219/109

(Continued)

FOREIGN PATENT DOCUMENTS

CN          102581437          7/2012
EP           2022592           2/2009
(Continued)

OTHER PUBLICATIONS

International Search Report from PCT application No. PCT/US2014/036141 dated Oct. 10, 2014, 11 pgs.

*Primary Examiner* — Steven J Ganey
*Assistant Examiner* — Christopher R Dandridge
(74) *Attorney, Agent, or Firm* — McAndrews, Held & Malloy, Ltd.

(57) ABSTRACT

A welding system includes a repositionable temperature sensor. The repositionable temperature sensor is configured to detect temperatures corresponding to a workpiece and to provide temperature data corresponding to the detected temperatures. The welding system also includes a power supply configured to receive the temperature data from the temperature sensor. The power supply is configured to modify control of an output of the power supply based on the detected temperature.

20 Claims, 3 Drawing Sheets

(51) Int. Cl.
  *B23K 9/167* (2006.01)
  *B23K 9/173* (2006.01)
  *B23K 9/32* (2006.01)
  *B23K 10/00* (2006.01)
  *B23K 31/12* (2006.01)
  *B23K 101/06* (2006.01)
  *B23K 101/18* (2006.01)

(52) U.S. Cl.
  CPC .............. *B23K 9/167* (2013.01); *B23K 9/173* (2013.01); *B23K 9/322* (2013.01); *B23K 10/00* (2013.01); *B23K 31/125* (2013.01); *B23K 2101/06* (2018.08); *B23K 2101/18* (2018.08)

(58) Field of Classification Search
  CPC .... B23K 9/1006; B23K 9/095; B23K 9/0953; B23K 9/067; B23K 9/0732; B23K 9/1087; B23K 9/23; B23K 9/173; B23K 9/1336; B23K 11/24; B23K 11/25; B23K 11/252; B23K 11/256; B23K 11/257; B23K 11/258
  USPC ............................................ 219/110, 130.01
  See application file for complete search history.

(56) References Cited

U.S. PATENT DOCUMENTS

| | | | | |
|---|---|---|---|---|
| 6,153,848 | A * | 11/2000 | Nagae | B23K 11/04 219/110 |
| 6,585,146 | B2 * | 7/2003 | Shepard | G01N 25/72 228/104 |
| 2009/0173726 | A1 * | 7/2009 | Davidson | B23K 9/0956 219/130.01 |
| 2009/0298024 | A1 * | 12/2009 | Batzler | B23K 9/32 434/234 |
| 2012/0145688 | A1 * | 6/2012 | Moon, Jr. | B23K 9/0956 219/130.01 |
| 2013/0264315 | A1 * | 10/2013 | Hung | B23K 9/32 219/74 |
| 2014/0263227 | A1 * | 9/2014 | Daniel | B23K 9/0956 219/130.01 |

FOREIGN PATENT DOCUMENTS

| | | | | |
|---|---|---|---|---|
| EP | 2292363 | * | 3/2011 | ............ B23K 9/095 |
| JP | S58151963 | | 9/1983 | |

\* cited by examiner

WELDING SYSTEM FOR DETERMINING A QUALITY OF A WELDING OPERATION

This application is a Non provisional Patent Application of U.S. Provisional Patent Application No. 61/822,035 entitled "WELDING SYSTEM FOR DETERMINING A QUALITY OF A WELDING OPERATION", filed May 10, 2013, which is incorporated herein by reference in its entirety.

BACKGROUND

The invention relates generally to welding systems and, more particularly, to a welding system for determining a quality of a welding operation.

Welding is a process that has increasingly become utilized in various industries and applications. Such processes may be automated in certain contexts, although a large number of applications continue to exist for manual welding operations. In both cases, such welding operations rely on a variety of types of equipment to ensure the supply of welding consumables (e.g., wire feed, shielding gas, etc.) is provided to the weld in appropriate amounts at the desired time.

Welding operations are performed on a variety of different materials (e.g., metallic materials). For example, a workpiece may be formed from a carbon steel or a corrosion resistant alloy, such as stainless steel. A time duration of heat that the workpiece is exposed to may be managed for obtaining certain metallurgical characteristics. For example, certain preheat temperatures, interpass temperatures, heat input of welding, and/or other welding parameters may be managed. Accordingly, a quality of a welding operation on a workpiece may depend on a time history of temperatures that the workpiece is exposed to during the welding operation. Unfortunately, it may be difficult to detect the temperature of a workpiece near a joint while a welding operation is occurring on the joint in conjunction with timing data corresponding to the welding operation. Thus, it may be difficult to determine a time history of temperatures that a workpiece is exposed to during the welding operation.

BRIEF DESCRIPTION

In one embodiment, a welding system includes a movable temperature sensor configured to detect temperatures corresponding to a workpiece and to provide temperature data corresponding to the detected temperatures. The welding system also includes a power supply configured to receive the temperature data from the temperature sensor. The power supply is configured to modify control of an output of the power supply based on the detected temperature.

In another embodiment, there is a method for determining a quality of a welding operation. The method includes receiving, via a power supply, a temperature signal representative of one or more temperatures of a workpiece detected by a temperature sensor during an operation for the workpiece. The method further includes processing the temperature signal to derive a processed temperature data, and receiving operations data corresponding to the operation for the workpiece. The method additionally includes determining a quality of the operation by applying the processed temperature data and the operations data.

In a further embodiment, there is a tangible, non-transitory computer-readable medium comprising instructions configured to receive, via a power supply, a temperature signal representative of one or more temperatures of a workpiece detected by a temperature sensor during an operation for the workpiece. The instructions are additionally configured to process the temperature signal to derive a processed temperature data and to receive operations data corresponding to the operation for the workpiece. The instructions are further configured to determine a quality of the operation by applying the processed temperature data and the operations data.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
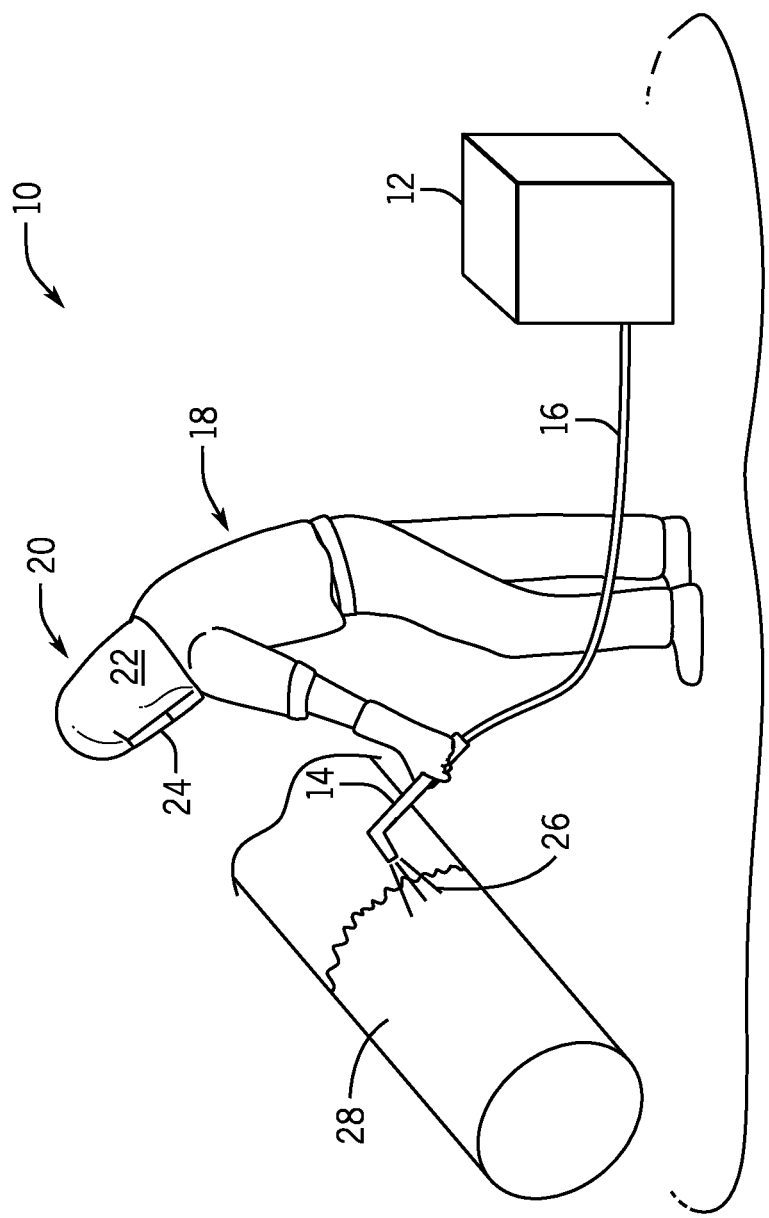
FIG. 1 is an illustration of an embodiment of a welding system including a workpiece that may be formed from a carbon steel or a corrosion resistant alloy, in accordance with aspects of the present disclosure.

Embodiments of the present invention may be used in any application where one or more temperatures may be detected. For example, FIG. 1 illustrates an arc welding system 10. As depicted, the arc welding system 10 may include a power supply 12 that generates and supplies welding power to an electrode 14 via a conduit 16. In the arc welding system 10, a direct current (DC) or alternating current (AC) may be used along with the consumable or non-consumable electrode 14 to deliver current to the point of welding. In such a welding system 10, an operator 18 may control the location and operation of the electrode 14 by positioning the electrode 14 and triggering the starting and stopping of the current flow. As illustrated, a helmet assembly 20 is worn by the welding operator 18. The helmet assembly 20 includes a helmet shell 22 and a lens assembly 24 that may be darkened to prevent or limit exposure to the light generated by a welding arc 26.

When the operator 18 begins the welding operation (or other operation such as plasma cutting) by applying power from the power supply 12 to the electrode 14, the welding arc 26 is developed between the electrode 14 and a workpiece 28, such as the illustrated pipe. The workpiece 28 may be formed from a carbon steel or a corrosion resistant alloy, such as stainless steel, or other metals and alloys (e.g., aluminum, titanium, zirconium, niobium, tantalum, nickel alloys). Non-metal workpieces 28 may also be welded or otherwise joined, for example, by stir welding. The electrode 14 and the conduit 16 thus deliver current and voltage sufficient to create the welding arc 26 between the electrode 14 and the work piece 28. The welding arc 26 melts the metal (the base material and any filler material added) at the point of welding between the electrode 14 and the workpiece 28, thereby providing a joint when the metal cools. The welding system 10 may be configured to form a weld joint by any suitable technique, including shielded metal arc welding (SMAW) (i.e., stick welding), gas tungsten arc welding (GTAW), gas metal arc welding (GMAW), flux-cored arc welding (FCAW), metal inert gas welding (MIG), tungsten inert gas welding (TIG), gas welding (e.g., oxyacetylene welding), sub-arc welding (SAW), and/or resistance welding. As may be appreciated, shielding gas may be used in certain applications, such as GTAW, GMAW, and FCAW, for example. Waveforms used during welding may include regulated metal deposition (RMD) type waveforms, among others, surface tension transfer (STT), cold metal transfer (CMT).

Generally, the techniques described herein enable certain operations (e.g., welding, cutting, grinding, induction heating, testing) to be performed on the workpiece 28 by applying power supplied by the power supply 12. The workpiece 28 may be disposed in an industrial facility (e.g., industrial plant, shipyard) but may also be disposed in a residential facility, such as a garage or a home. The workpiece 28 may include tubular pieces (e.g., pipe), flat sheeting (e.g., metal or plastic sheets and plates), angled workpieces 28 (e.g., angle iron) or any other piece that may be welded, cut, ground, induction heated, or tested, for example, by using power delivered via the power supply 12.

As described below, heat applied to the workpiece 28 may be detected (e.g., sensed) using one or more temperature sensors. The power supply 12 may be configured to store the detected data. By using the temperature sensors, temperatures of the workpiece 28 near a welding application may be detected and/or monitored to determine a quality of a welding operation and/or to control temperature of a welding operation being performed. As may be appreciated, temperature sensors may be used in any application where temperature detection is desired, such as welding, cutting, grinding, induction heating, testing, and so forth.

Figure 2:
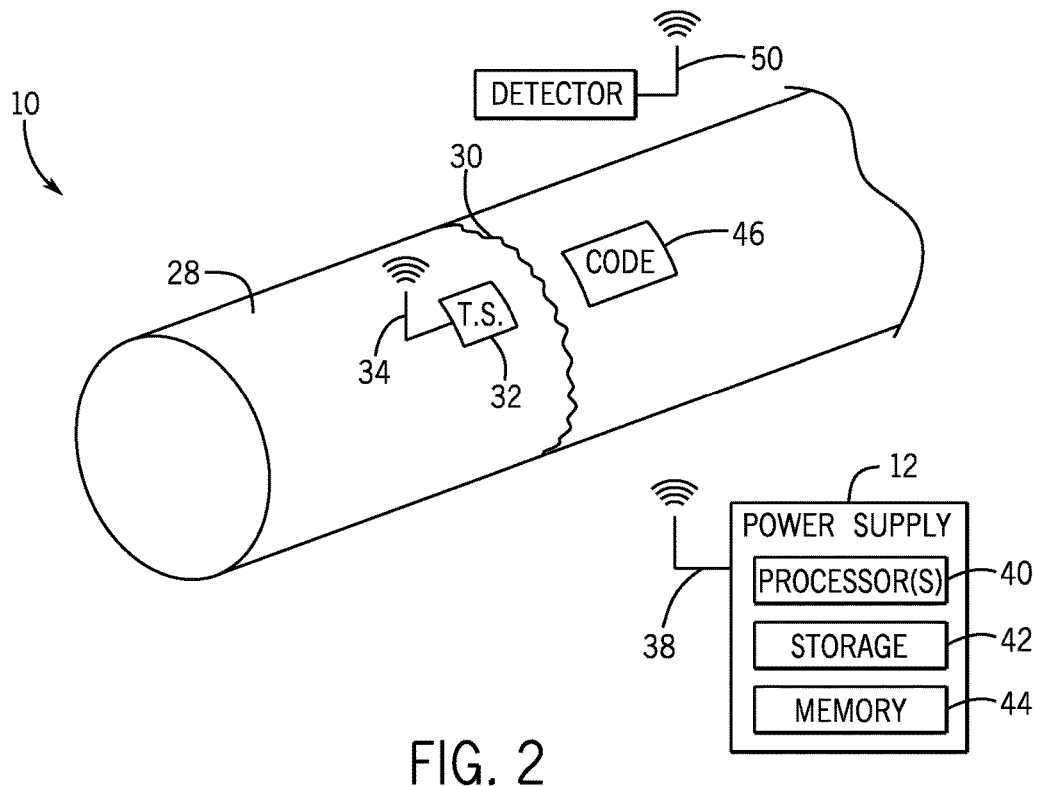
FIG. 2 is an illustration of an embodiment of a welding system that may be used to determine a quality of a welding operation, in accordance with aspects of the present disclosure.

FIG. 2 is an illustration of an embodiment of the welding system 10 that may be used to determine a quality of a welding operation. The workpiece 28 has a joint 30 where joining (e.g., welding) is to be performed. A sensor 32 is positioned adjacent to the joint 30 to detect one or more temperatures of the workpiece 28 before, during, and/or after the joint 30 is welded. Additionally or alternatively, the sensors, such as the sensor 32, may detect rotational speed of the workpiece 28, a deposition rate of welding of the joint 32, a cooling rate of the workpiece 28, a gas on or around the workpiece 28 (e.g., amount of gas such as acetylene, oxygen, argon, helium, or any other gas), and preheating of the workpiece 28 (e.g., whether the workpiece 28 was preheated and/or preheating rate). Data from the sensor(s) 32 may aid in determining a quality of operations on the workpiece 28, as described in more detail below with respect to FIG. 5.

The sensor 32 may be positioned within one to four inches or more from the joint 30, in certain embodiments. While one sensor 32 is illustrated, the welding system 10 may include 1, 2, 3, 4, 5, or more sensors. While the workpiece 28 has a circular outer surface in the illustrated embodiment, in other embodiments, the workpiece 28 may have a outer or inner surface that is triangular, square, rectangular, or any other standard or non-standard shape of outer surface. The sensor 32 may be disposed on the outer surface or on the inner surface using a variety of fastening techniques, including magnetic mounts, clamps, gravity (e.g., when a sensor 32 is placed on top of a non-moving workpiece), and the like.

The temperature sensor 32 may be any suitable device that can provide indications (e.g., temperature data) that correspond to temperatures. For example, the temperature sensor 32 may be a thermocouple, a bimetallic switch, a resistance temperature detector (RTD), a thermistor, a wax motor (e.g., actuator device suitable for converting thermal-to-mechanical energy via phase change behavior of waxes), and/or an infrared detector. Furthermore, the temperature sensor 32 may provide indications that correspond to temperatures being measured by using wired and/or wireless communication. As illustrated, the temperature sensor 32 is configured to communicate using wireless signals 34. Moreover, the power supply 12 (e.g., welding power supply suitable for providing electric power for welding operations) is configured to receive wireless signals 38 from the temperature sensor 32. In other embodiments, another device may be configured to receive the wireless signals 34 provided by the temperature sensor 32. As may be appreciated, the indications transmitted by the sensor 32 may be representative of temperatures, but may actually be voltages, current flows, capacitive values or other signals that correspond to various temperatures. In another embodiment, the sensor 32 may transmit actual temperatures measurements alternative to or in addition to signals representative of temperatures.

The power supply 12 includes one or more processors 40, storage devices 42, and memory devices 44. The processor(s) 40 may be used to execute software, such as data processing, welding operation quality determination, welding control, converting indications from the temperature sensor 32 to temperature data, and so forth. Moreover, the processor(s) 40 may include one or more microprocessors, such as one or more "general-purpose" microprocessors, one or more special-purpose microprocessors and/or application specific integrated circuits (ASICS), or some combination thereof. For example, the processor(s) 40 may include one or more reduced instruction set (RISC) processors, digital signal processors (DSP), microcontrollers, field-programmable gate arrays (FPGA), custom chips, and the like.

The storage device(s) 42 (e.g., nonvolatile storage) may include read-only memory (ROM), flash memory, a hard drive, or any other suitable optical, magnetic, or solid-state storage medium, or a combination thereof. The storage device(s) 42 may store data (e.g., welding data, temperature data, historical data, indications from the temperature sensor 32, etc.), instructions (e.g., software or firmware for determining welding quality, temperature conversions, welding control, etc.), and any other suitable data.

The memory device(s) 44 may include a volatile memory, such as random access memory (RAM), and/or a nonvolatile memory, such as ROM, including updatable ROM such as flashable ROM. The memory device(s) 44 may store a variety of information and may be used for various purposes. For example, the memory device(s) 44 may store processor-executable instructions (e.g., firmware or software) for the processor(s) 40 to execute, such as instructions for determining a quality of a welding operation.

The workpiece 28 includes identification data 46 (e.g., a code). The identification data 46 may be used to identify the welding operation to be performed on the joint 30. For example, the identification data 46 may identify a job number, a work order number, and so forth. In certain embodiments, the identification data 46 may be a bar code, a quick response (QR) code, radio frequency identification (RFID), or any other suitable code that may uniquely identify a welding operation. While in the depicted embodiment the identification data 46 is shown as disposed on the workpiece 28, in other embodiments the identification data 46 may be disposed on a job packet, a move ticket, or generally physically separate from the workpiece 28. The identification data 46 may also be entered, for example, into a system such as the power supply 12 via a buttons or a keyboard disposed on the power supply 12 or via buttons or a keyboard disposed on a remote device, such as an infrared remote, a radio frequency (RF) remote, Bluetooth device, WiFi device, and the like. The welding system 10 includes a detector 48 configured to detect the identification data 46. In certain embodiments, the detector 48 may be a bar code detector. The detector 48 provides wireless signals 50 that may be received by the power supply 12. As may be appreciated, by using the temperature sensor 32, temperatures of the workpiece 28 may be detected and/or monitored. Accordingly, a quality of a welding operation on the joint 30 may be determined and/or controlled. For example, the power supply 12 may derive that the temperature is at a level undesired for certain operations, and may notify the user via visual and/or audio notifications (e.g., lights, beeps, screen displays). The power supply 12 may also suspend operations of the temperature is found to be at an undesired level (e.g., too high or too low).

The power supply 12 may be informed of the type of operation to be performed (e.g., welding, plasma cutting, grinding, induction heating, testing) via on-device input (e.g., keyboard, buttons, switches) and/or remotely from an external device (e.g., Bluetooth enabled mobile device, WiFi device). Accordingly, the power supply may include a wireless module suitable for sending and receiving wireless signals from the sensor 32 and external devices. The power supply 12 may also receive further inputs based on the operation to be performed, such as operation supplies used (e.g., welding wire/electrode type), metal/alloy or plastic type of the workpiece 28 being operated on, size of the workpiece 28, and so on. The power supply 12 may then use the input to derive a desirable temperature range, thus improving a quality of various operations as applied to various workpieces 28.

Figure 3:
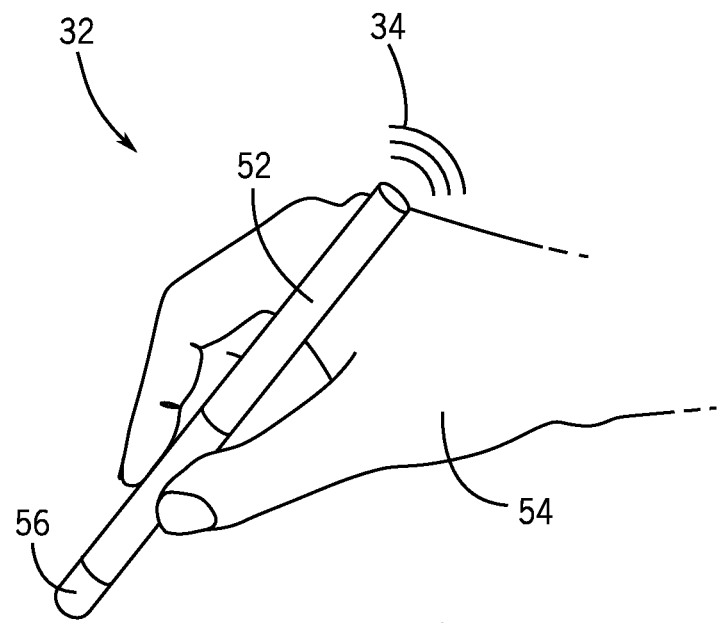
FIG. 3 is a perspective view of an embodiment of the temperature sensor 32 in the form of a handheld device for detecting temperatures during a welding operation, in accordance with aspects of the present disclosure.

FIG. 3 is a perspective view of an embodiment of the temperature sensor 32 in the form of a handheld device 52 for detecting temperatures during a welding operation. As illustrated, the handheld device 52 communicates wirelessly using the wireless signals 34. The handheld device 52 may be held by a hand 54 of an operator to direct (e.g., point) a sensing tip 56 (e.g., an end (contact or non-contact) used to detect temperatures) positioned at a proximal end of the device 52 at a desired location. With the sensing tip 56 directed at a desired location, the handheld device 52 may detect temperatures at, or near, a welding operation. The handheld device 52 may include multiple sensors disposed in the tip 56, including one or more temperature sensors and one or more sensors suitable for reading the code 46. For example, the sensors may include optical sensors useful in reading QR and/or barcodes, and RFID sensors useful in reading RFID tags.

As illustrated, the handheld device 52 may provide indications corresponding to the temperatures wirelessly to the power supply 12 for storage, processing, and/or analysis. The handheld device 52 may additionally provide the code 46, useful in deriving the type of workpiece 28 (e.g., material type, size) and/or the operation to be performed on the workpiece 28. In certain embodiments, the handheld device 52 may include a removable storage device, such as a memory stick, universal serial bus (USB) flash drive, etc., for storing indications corresponding to temperatures detected. The removable storage device may be configured to store a date and/or a time associated with the indications corresponding to temperatures detected. Furthermore, in certain embodiments, the handheld device 52 may have a built-in storage device. Accordingly, the handheld device 52 may be directly connected to the power supply 12, a computer, or another device for transferring data from the storage device of the handheld device 52. Thus, using the handheld device 52 temperatures at, or near, a welding operation may be detected.

Figure 4:
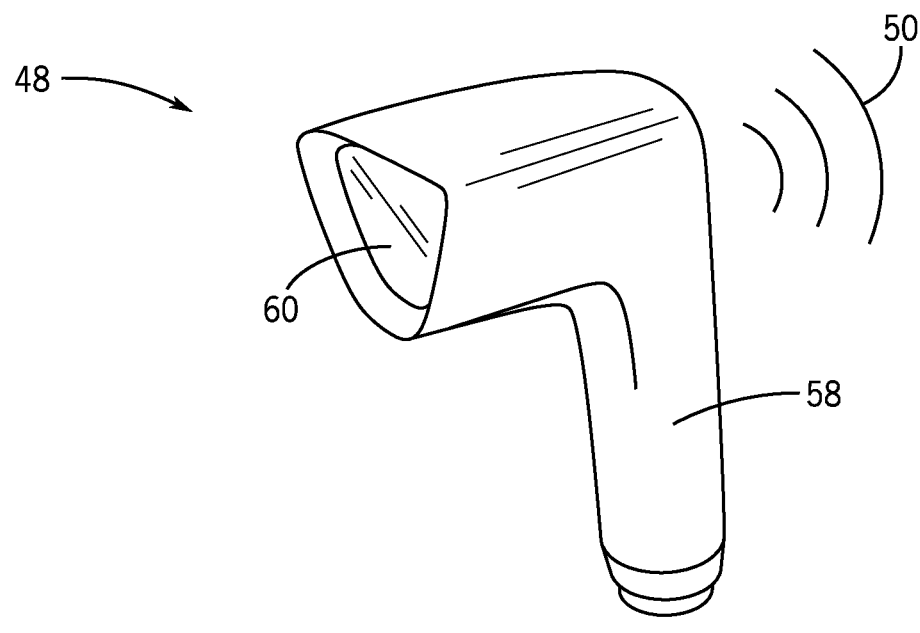
FIG. 4 is a perspective view of an embodiment of a detector for identifying a welding operation, in accordance with aspects of the present disclosure.

FIG. 4 is a perspective view of an embodiment of the detector 48 suitable for identifying a welding operation. The detector 48 includes a handle 58 that enables an operator to hold the detector 48 and to aim the detector 48 toward a desired direction. Moreover, the detector 48 includes a scanner 60, such as a bar code scanner, for detecting the identification data 46 used to identify the weld and/or a welding operator. The detector may additionally or alternatively include an RFID receive useful in detecting RFID signals provided via RFID embodiments of the identification data 46. As discussed above, the detector 48 may provide identification data 46 to the power supply 12 using the wireless signals 50. In one embodiment, the identification data 46 may be used to correlate temperature data and/or welding data performed during a welding operation with a weld on the workpiece 28. The identification data 46 may also include data related to the type of workpiece 28 (e.g., material type, size) and/or the operation to be performed on the workpiece 28. Accordingly, the power supply 12 may use the identification data 46 to control operations, as well as to notify the user 18 of temperature data or undesired temperature conditions.

In certain embodiments, the detector 48 may include a removable storage device, such as a memory stick, USB flash drive, etc, for storing detected identification data 46. The removable storage device may be configured to store a date and/or a time associated with the detected identification data. Furthermore, in certain embodiments, the detector 48 may have a built-in storage device, e.g., built-in non-removable flash memory. Accordingly, the detector 48 may be directly connected to the power supply 12, a computer, or another device for transferring data from the detector 48 from the removable storage device or the built-in memory. As illustrated, the detector 48 includes a socket 62 that enables the handheld device 52 to be inserted therein. In one embodiment, the socket 62 may include an electrical connector providing communications and/or power to the handheld device 52. Accordingly, the detector 48 may provide data to the handheld device 52 and/or the handheld device 52 may provide data to the detector 48. Therefore, identification data and temperature related data may be stored and/or wirelessly transmitted together via the device 52, the detector 58, or combination thereof.

Figure 5:
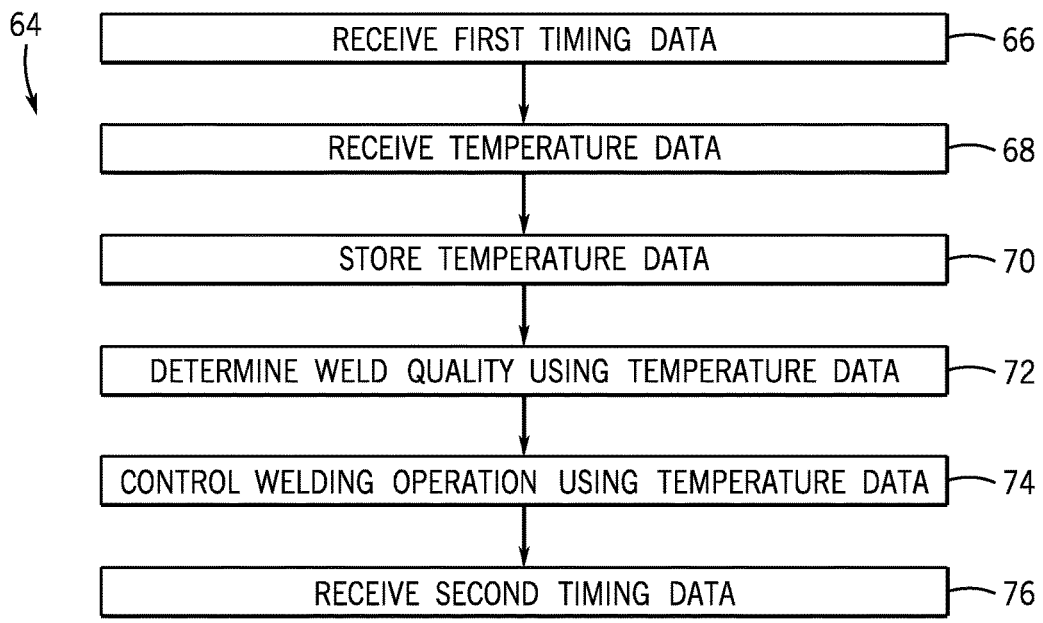
FIG. 5 is a flowchart of an embodiment of a method for determining a quality of a welding operation, in accordance with aspects of the present disclosure.

FIG. 5 is a flowchart of an embodiment of a process 64 for determining a quality of a welding operation. The process 64 may be implemented as computer-executable instructions or code stored in a non-transitory computer readable medium, such as the memory 44, and executed by one or more processors, such as the processors 40. The process 64 may be executed and stored by the power supply 12 and/or the cloud-based device, the welding accessory, the pendant, the wire feeder, the welding helmet, the welding torch, the module, the communication interface, and so forth. The power supply 12 (or another device, such as a cloud-based device, welding accessory, a pendant, a wire feeder, a welding helmet, a welding torch, a module suitable for retrofitting the power supply 12 with the techniques described herein, a communication interface, and so forth) receives first timing data indicating a first time before, during, or after a welding or other operation (e.g., cutting, grinding, induction heating, testing) begins (block 66). For example, the detector 48 may be used to detect, before the welding operation begins, the identification data 46 that corresponds to the welding operation. The detector 48 may provide the identification data 46 and/or a time (e.g., date and time) to the power supply 12. The power supply 12 (or another device, such as the cloud-based device, the welding accessory, the pendant, the wire feeder, the welding helmet, the welding torch, the module, the communication interface, and so forth) receives temperature data representative of one or more temperatures of the workpiece 28 detected during the welding operation after receiving the first timing data (block 68). For example, the power supply 12 may receive the temperature data wirelessly, using a wired connection, using a memory storage device, and so forth. Furthermore, the power supply 12 stores the temperature data (or processed temperature data) together with welding data corresponding to the welding operation and the first timing data to correlate data of the welding operation (block 70). As used herein, the term "processed temperature data" refers to temperature data that has been modified, such as a sensed voltage converted to a temperature.

The power supply 12 determines a quality of the welding operation using the temperature data and the welding data (block 72). In certain embodiments, the power supply 12, other device, e.g., cloud-based server, determines whether the temperature data indicates that temperatures are within a predetermined range. For example a measure of quality of the operation on the workpiece 28 may include how long the operation occurred at a desired temperature or temperature range. The measure of quality of the operation on the workpiece 28 may additionally or alternatively include rotational speed, or speed of any movement of the workpiece 28 (or welding torch 26) during operations. For example, certain materials may be welded, cut, tested, heated, and so on, at a desired movement speed or ranges of speed of the torch 26 and/or the workpiece 28. The measure of quality of the operation on the workpiece 28 may additionally or alternatively include a cooling rate of the workpiece 28. For example, after application of the torch 26, the workpiece may be cooled for a certain time, as desired.

Likewise, the measure of quality of the operation on the workpiece 28 may additionally or alternatively include whether or not preheating was applied, and/or a rate of preheating. For example, certain materials and operations may have higher quality when the workpiece 28 is preheated prior to welding, cutting, and so on. The measure of quality of the operation on the workpiece 28 may additionally or alternatively include gas monitoring via the sensor(s) 32. For example, the presence and/or amount of certain gases on or near the workpiece 28 may be indicative of quality of the operation. Power supply data may also be indicative of quality of the operation. For example, voltage levels, current levels, waveforms used, and the like, may be indicative of quality of the operation.

In certain embodiment, the power supply 12 may provide data, including identification data 46, temperature data, rotational speed data, deposition rate data, cooling rate data, preheating data, gas monitoring data, and power supply 12 data (e.g., power currently being used) the to the associated device (e.g., computer server communicatively coupled to the power supply 12) and/or to a cloud for further analysis.

The power supply 12 may also analyze the data. The analysis may include real-time analysis of the data (e.g. temperature data and operations data such as temperature and power currently used) being transmitted via the power supply 12. For example, the associated device and/or cloud-based server may process (and store) the data to determine if an operation is proceeding as desired, and may then transmit data back to the power supply 12 based on this determination, such as a measure of quality of the operation. The power supply 12 may then inform the operator and/or provide control actions, such as stopping power if the temperature is deemed too high.

The power supply 12 may additionally or alternatively provide for data processing. For example, the power supply 12 may determine whether the temperature data indicates that temperatures are within an acceptable range, an unacceptable range, or some combination thereof. Likewise, rotational speed data, deposition rate data, cooling rate data, preheat data, and/or gas monitoring data may be used to determine acceptable ranges and/or a quality of the operation. For example, the quality measure may include a graded measure (e.g., from 1 to 100) where higher numbers imply higher quality based on the analysis described herein. Moreover, the power supply 12 controls the welding operation using the temperature data (block 74). For example, in certain embodiments, the power supply 12 may be configured to provide a signal (e.g., warning) to a welding operator while the temperature or other measure (e.g., rotational speed data, deposition rate data, cooling rate data, preheat data, and/or gas monitoring data) is outside a desired range, or while the measure is within a desired range, based at least partly on the data received from the sensor 32. The power supply 12 receives second timing data indicating a second time after the welding operation is performed (block 76). For example, the second timing data may include the identification data 46 that corresponds to a second welding operation. Using the temperature sensor 32 and other devices described herein, temperatures of the workpiece 28 may be detected and/or monitored. Accordingly, a quality of a welding operation on the joint 30 may be determined and/or controlled. Specifically, temperatures that a workpiece is exposed to during the welding operation may be managed.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system comprising:
a repositionable temperature sensor configured to detect a plurality of temperatures corresponding to a workpiece and to provide a plurality of temperature signals corresponding to the detected temperatures during a welding operation for the workpiece; and
a power supply that, when in operation,
receives the plurality of temperature signals from the temperature sensor,
compares the plurality of temperature signals to a plurality of threshold temperatures,
determines a duration of time the welding operation occurred within a desired range of threshold temperatures, and
modifies control of an output of the power supply for the welding operation on the workpiece based at least in part on the detected temperatures and the duration.

2. The welding system of claim 1, wherein a processing of the plurality of temperature signals derives a first result, wherein the first result comprises the detected temperatures.

3. The welding system of claim 2, wherein the power supply is configured to execute the processing of the plurality of temperature signals to derive the first result, and
wherein the power supply is configured to provide a visual or audio indication of the first result.

4. The welding system of claim 2, wherein the power supply is configured to communicate the plurality of temperature signals to an external device, and the external device is configured to execute the processing of the plurality of temperature signals to derive the first result.

5. The welding system of claim 4, wherein the external device comprises a cloud-based device.

6. The welding system of claim 1, wherein the temperature sensor comprises a wireless temperature sensor disposed in a handheld device.

7. The welding system of claim 1, wherein the temperature sensor comprises a wireless temperature sensor configured to be mounted onto the workpiece.

8. The welding system of claim 1, comprising a detector configured to detect identification data used to uniquely identify an operation and to provide the identification data to the power supply, wherein the operation comprises a welding operation, a cutting operation, a grinding operation, an induction heating operation, or a testing operation, or a combination thereof, and wherein power for the operation is provided via the power supply.

9. The welding system of claim 8, wherein the identification data comprises a bar code, quick response (QR) code, a radio frequency identification (RPID), or a combination thereof.

10. The welding system of claim 2, wherein the power supply is configured to derive a second result based on the first result, and wherein the second result comprises a measure of quality of an operation performed on the workpiece.

11. The welding system of claim 1, wherein an external device is configured to receive the plurality of temperature signals and to provide a visual indication, an audio indication, storage, or combination thereof, of the detected temperatures.

12. A method for determining a quality of a welding operation, comprising:
receiving, via a power supply, a plurality of temperature signals representative of one or more temperatures of a workpiece detected by a temperature sensor during an operation for the workpiece;
processing the plurality of temperature signals to derive a processed temperature data;
comparing the processed temperature data to a desired range of threshold temperatures;
determining a duration of time the operation occurred within the desired range of threshold temperatures;
receiving operations data corresponding to the operation for the workpiece;
determining a quality of the operation by applying the processed temperature data, the duration of time, and the operations data; and
controlling the operation for the workpiece based at least in part on the processed temperature data, the duration of time, and the operations data.

13. The method of claim 12, wherein processing the plurality of temperature signals to derive the processed temperature data comprises the power supply processing the plurality of temperature signals, a cloud-based device processing the temperature data, or a combination thereof.

14. The method of claim 12, comprising transmitting the plurality of temperature signals to a cloud-based device, wherein the cloud-based device is configured to store the temperature signal.

15. The method of claim 12, wherein receiving the plurality of temperature signals comprises receiving the temperature signal via a memory storage device, via a handheld device configured to wirelessly transmit the plurality of temperature signals, or a combination thereof.

16. The method of claim 12, wherein determining the quality of the operation is based on the plurality of temperature signals, the duration of time, a speed of the workpiece, a speed of a welding torch speed coupled to the power supply, a deposition rate on the workpiece, a cooling rate of the workpiece, a preheating of the workpiece, a gas monitoring, a power supply voltage, a power supply current, a power supply waveform, or a combination thereof.

17. The method of claim 12, further comprising updating the desired range of threshold temperatures based on the plurality of temperature signals.

18. A tangible, non-transitory computer-readable medium comprising instructions that when executed by a processor, cause the processor to:
receive, via a power supply, a plurality of temperature signals representative of one or more temperatures of a workpiece detected by a temperature sensor during an operation for the workpiece;
process the plurality of temperature signals to derive a processed temperature data;
comparing the processed temperature data to a desired range of threshold temperatures;
determining a duration of time the operation occurred within the desired range of threshold temperatures;
receive operations data corresponding to the operation for the workpiece;
determine a quality of the operation by applying the processed temperature data, the duration of time, and the operations data; and
control the operation for the workpiece based at least in part on the processed temperature data, the duration of time, and the operations data.

19. The computer-readable medium of claim 18, wherein processing the plurality of temperature signals to derive the processed temperature data comprises the power supply processing the plurality of temperature signals, an external device processing the temperature data, or a combination thereof.

20. The computer-readable medium of claim 18, comprising instructions configured to transmit, via the power supply, the plurality of temperature signals, the duration of time, a speed of the workpiece signal, a speed of a welding torch signal, a deposition rate signal, a cooling rate signal, a preheating signal, a gas monitoring signal, a power supply voltage signal, a power supply current signal, a power supply waveform signal, or a combination thereof, to an external device.

* * * * *